United States Patent [19]
Hamburg

[11] Patent Number: 5,819,278
[45] Date of Patent: Oct. 6, 1998

[54] MAINTAINING INVALIDATION INFORMATION IN TILED IMAGE REPRESENTATIONS

[75] Inventor: Mark Hamburg, Scotts Valley, Calif.

[73] Assignee: Adobe Systems Incorporated, San Jose, Calif.

[21] Appl. No.: 697,368

[22] Filed: Aug. 23, 1996

[51] Int. Cl.$^6$ .................................................. G06F 17/30
[52] U.S. Cl. ........................ 707/101; 707/100; 345/434; 345/435
[58] Field of Search .................................. 345/501, 511, 345/427, 326, 434, 435; 707/100, 101

[56] References Cited

U.S. PATENT DOCUMENTS

| | | | |
|---|---|---|---|
| 4,806,919 | 2/1989 | Nakayama et al. | 340/721 |
| 4,849,907 | 7/1989 | Aotsu et al. | 345/434 |
| 5,263,136 | 11/1993 | DeAguiar et al. | 395/164 |
| 5,369,739 | 11/1994 | Akeley | 345/434 |
| 5,412,775 | 5/1995 | Maeda et al. | 395/158 |
| 5,500,933 | 3/1996 | Schnorf | 345/302 |
| 5,574,836 | 11/1996 | Broemmelsick | 395/127 |
| 5,577,188 | 11/1996 | Zhu | 395/326 |

OTHER PUBLICATIONS

Edson, Dave, "Dave's Top Ten List of Tricks, Hints, and Techniques for Programming in Windows", Microsoft Systems Journal, vol. 7 No. 6, Oct. 1992, pp. 31–53.

Prosise, Jeff, Programming Windows 95 with MFC. Part II: Working With Display Contexts, Pens, and Brushes, Microsoft Systems Journal, vol. 10, No. 7, Jul. 1995, pp. 39–56.

Blatner, David et al., *Real World Photoshop 3 Industrial Strength Production Techniques*, pp. 453–455 (1996).

Fits Imaging et al., *Live Picture*, pp. 108–111 (1994).

Wolberg, George, *Digital Image Warping*, pp. 52–56, 214–219 (1990).

Meyers, Scott, *More Effective C++*, pp. 190–194 (1996).

*Primary Examiner*—Paul R. Lintz
*Attorney, Agent, or Firm*—Fish & Richardson P.C.

[57] ABSTRACT

A method and apparatus for tracking invalidation information in tiled pixel image representations that combines the concept of an invalidation rectangle with the concept of invalid tile flags. A pixel is considered as being possibly invalid if and only if it lies within the invalidation rectangle and the tile containing that pixel is flagged as invalid. In accordance with the present invention, to invalidate an area, the implementing program generates an invalidation rectangle so that it bounds the area and the previous invalidation rectangle (if not empty), and also sets the invalid tile flags in the tiles overlapping that area. To validate an area A within an image, the inventive method performs the following steps: Define area B as the intersection of the area A to be validated with the invalidation rectangle. If area B is empty, the process is done: no pixels in area A are invalid. If area B is not empty, then determine which tiles intersect area B. For each tile intersecting area B, if the tile is marked as valid, and more tiles need to be processed, get the next tile that intersects area B. If all tiles have been processed, the process is done. If a tile is marked invalid, then define area C as the intersection of the area covered by the tile with the invalidation rectangle. Then validate area C by recalculating all of the pixels in area C, and clear the invalid flag for that tile. If more tiles need to be processed, the next tile is fetched. Otherwise, the process is done: no pixels in any area C—and hence in area A —are invalid.

15 Claims, 4 Drawing Sheets

MAINTAINING INVALIDATION INFORMATION IN TILED IMAGE REPRESENTATIONS

BACKGROUND OF THE INVENTION

1. Field of the Invention

This invention relates to electronic computer systems, and more particularly to methods and apparatus for tracking invalidation information in tiled pixel image representations.

2. Description of Related Art

One use of computers is to manipulate graphical images, such as photographs, line drawings, etc. Frequently, such images are too large to fit into memory (as opposed to storage) at once. Accordingly, it is known to break such images into grids of subimages, commonly referred to as image tiles or simply "tiles", and manipulate one or a few tiles at a time within memory, swapping out from storage for other tiles as necessary. A grid of tiles may be of any size n×m, including 1×n, or n×1, in which case each tile is a strip across an image. Tiles can be of any shape that can be used to cover a 2-dimensional area and need not all be the same shape or size. For example, tiles can be hexagons in a "honeycomb" grid. Conventionally, however, rectangular tiles arranged in a regular rectangular grid are used for ease of manipulation.

One problem in image editing applications is how to keep track of the areas of an image that need to be recalculated in some way. This recalculation could be tied to incrementally previewing some image effect where part of the data is calculated and displayed, and then more data is calculated and displayed, etc. It is also of vital importance in maintaining image "pyramids" (i.e., image representations in which image data is stored at multiple resolutions), in which the base data is allowed to change, since changes to the base data require that data in the upper levels of the pyramid be recalculated from the data in lower levels.

Three fundamental operations are part of the process for tracking invalid areas of an image—i. e., areas that need to be recalculated, or processed in some other way:

1. marking an area of the image (including a single pixel) as invalid;
2. determining whether particular pixels (and areas of pixels) should be considered as possibly invalid; and
3. forcing an area of the image to be valid by invoking appropriate pixel calculations or other processing to make it so.

Several approaches for tracking such areas are known. One approach maintains an "invalid tile flag" per tile in the image. When an area is marked as invalid, a flag is set in each tile overlapping that area. A pixel is considered invalid if it belongs to a flagged tile. To force an area to be valid, the system finds all of the flagged tiles overlapping that area, recalculates all of the pixels in each tile, and clears the flag. The benefit of this scheme is that it is simple and makes it fairly easy to optimize disk storage traffic by observing that the pixels from an image tile marked as invalid do not need to be read from nor written to disk. The expense here is that even if only one pixel is invalid in a tile, the system must recalculate the whole tile.

FIG. 1 is a diagram of this first approach. A 3×3 rectangular tiled image 10 is shown, having an "L" shaped area 12 (reversed in the figure) depicted thereon. Each tile 14 may comprise, for example, 256×256 pixels. All of the pixels comprising the "L" shaped area 12 are marked invalid and shown in gray. Accordingly, each tile 14 that contains any of the pixels of the "L" shaped area 12 is flagged as invalid.

Suppose that an area A is to be validated. Because area A overlaps a tile 14 that is marked as invalid, the entire tile must be recalculated. This is particularly inefficient since none of area A in question was ever actually included in any of the invalidation operations (i.e., none of the pixels in area A were the same as any of the pixels in the "L" shaped area 12).

In a second approach, shown in FIG. 2A, an invalidation rectangle 16 is defined that contains all of the pixels needing recalculation. When any new area is marked as invalid, the rectangle is "grown" so that it contains all of the pixels in the old invalidation rectangle and all of the pixels in the new area being marked as invalid. A pixel is considered invalid if it is contained within the invalidation rectangle. Under this approach, validation can be quite a bit harder to keep limited in scope. The task is to find the largest rectangle within the invalidation rectangle that excludes all of the pixels in the area to be made valid. The system must then recalculate all of the pixels lying in the old rectangle but not in this new rectangle.

For example, referring to FIG. 2A, if the area A to validate does not overlap the invalidation rectangle 16, there is no need to do any recalculation. Consider, however, FIG. 2B, which shows the problem of having to recalculate the area A when it is within the invalidation rectangle 16 yet contains no pixels in common with the invalid "L" shaped area 12. The system must determine a new invalidation rectangle that excludes area A and then recalculate the pixels lying inside the old invalidation rectangle 16 but outside the new rectangle. This process must be done despite the fact that none of the pixels in area A were ever included in any of the areas passed to the invalidation operations.

The benefits of the invalidation rectangle approach are that it keeps invalidation areas small by avoiding marking entire tiles as invalid, and it is easy to calculate the representation of the invalid areas with each invalidation call. Further, the invalidation rectangle approach works well for highly localized changes where the cost of recalculating the entire invalid area is low. The drawbacks of the rectangle approach are that it aggressively expands the invalid area— for example, the system could record the same invalidation information in the example shown in FIG. 2B just by marking the top right and bottom left pixels of the gray area invalid—and that the validation logic is relatively tricky if recalculation is to be limited on a particular validation call.

In a third approach, if the number of pixels to be recalculated is to be minimized, then some form of region representation must be maintained that indicates the accumulated invalid areas minus the subsequently validated areas. There are a number of such representations, including those based on run length encoding, storing transitions, or storing a list of rectangles. These schemes have the benefit of being very accurate. The drawback of these schemes is that the storage consumption for the region representation is unpredictable and the region calculations can get somewhat time consuming for complex regions.

Accordingly, it would be desirable to have a simple method for tracking invalidation information in tiled image representations that reduces the number of pixels to be recalculated during validation yet is fast and space efficient. The present invention meets this need.

SUMMARY OF THE INVENTION

The present invention comprises a method and apparatus for tracking invalidation information in tiled pixel image representations that combines the concept of an invalidation rectangle with the concept of invalid tile flags. A pixel is considered as being possibly invalid if and only if it lies within the invalidation rectangle and the tile containing that pixel is flagged as invalid.

In accordance with the present invention, to invalidate an area, the implementing program generates an invalidation rectangle so that it bounds the area and the previous invalidation rectangle (if not empty), and also sets the invalid tile flags in the tiles overlapping that area. To validate an area A within an image, the inventive method performs the following steps: Define area B as the intersection of the area A to be validated with the invalidation rectangle. If area B is empty, the process is done: no pixels in area A are invalid. If area B is not empty, then determine which tiles intersect area B. For each tile intersecting area B, if the tile is marked as valid, and more tiles need to be processed, get the next tile that intersects area B. If all tiles have been processed, the process is done. If a tile is marked invalid, then define area C as the intersection of the area covered by the tile with the invalidation rectangle. Then validate area C by recalculating all of the pixels in area C, and clear the invalid flag for that tile. If more tiles need to be processed, the next tile is fetched. Otherwise, the process is done: no pixels in any area C—and hence in area A—are invalid.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations on the present invention.

The present invention combines the concept of an invalidation rectangle with the concept of invalid tile flags. A pixel is considered as being possibly invalid if and only if it lies within the invalidation rectangle and the tile containing that pixel is flagged as invalid.

As noted above, three fundamental operations are part of the process for tracking invalid areas of an image—i.e., areas that need to be recalculated, or processed in some other way:

1. marking an area of the image (including a single pixel) as invalid;

2. determining whether particular pixels (and areas of pixels) should be considered as possibly invalid; and 3. forcing an area of the image to be valid by invoking appropriate pixel calculations or other processing to make it so.

In accordance with the present invention, these operations are subject to the following restrictions: the second operation should report as possibly invalid all pixels marked by the first operation as invalid until such time as those pixels have been recalculated by the third operation. Note that the second operation may report that other pixels are also invalid even if they haven't been marked as such.

Furthermore, it is preferable if, after the application of the third operation, the second operation does not report any pixels as possibly invalid that were not reported as such before the application of the third operation.

Figure 1:
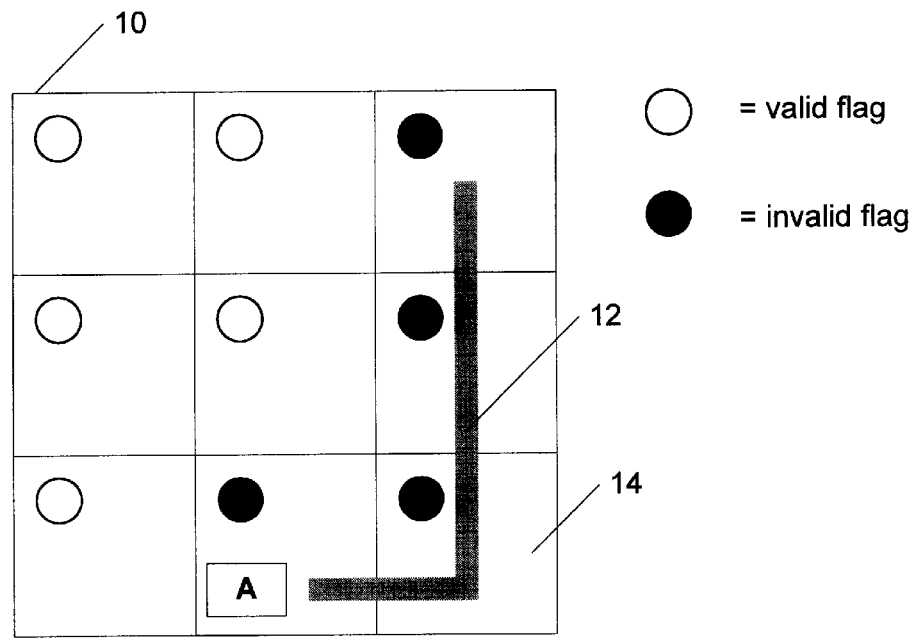
FIG. 1 is a diagram of a first prior art method for tracking invalidation information in tiled image representations.
Figure 2A:
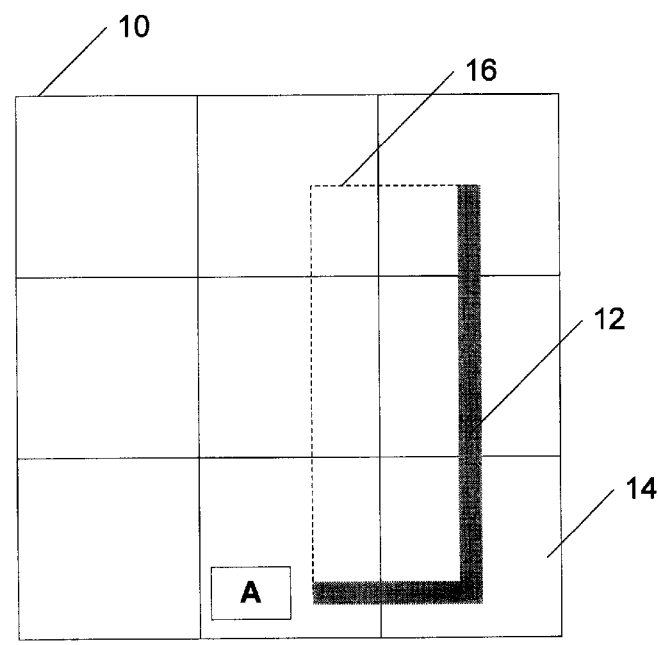
FIG. 2A is a first diagram of a second prior art method for tracking invalidation information in tiled image representations.
Figure 2B:
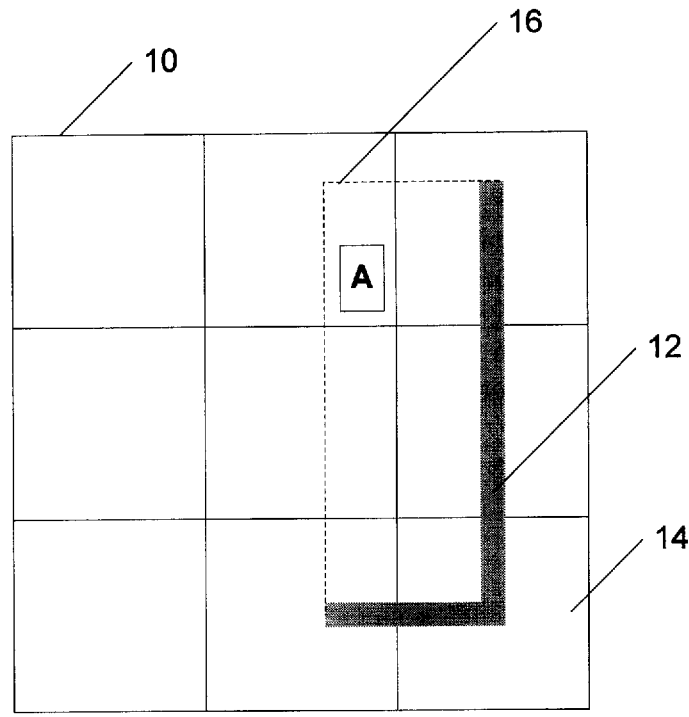
FIG. 2B is a second diagram of a second prior art method for tracking invalidation information in tiled image representations.
Figure 3A:
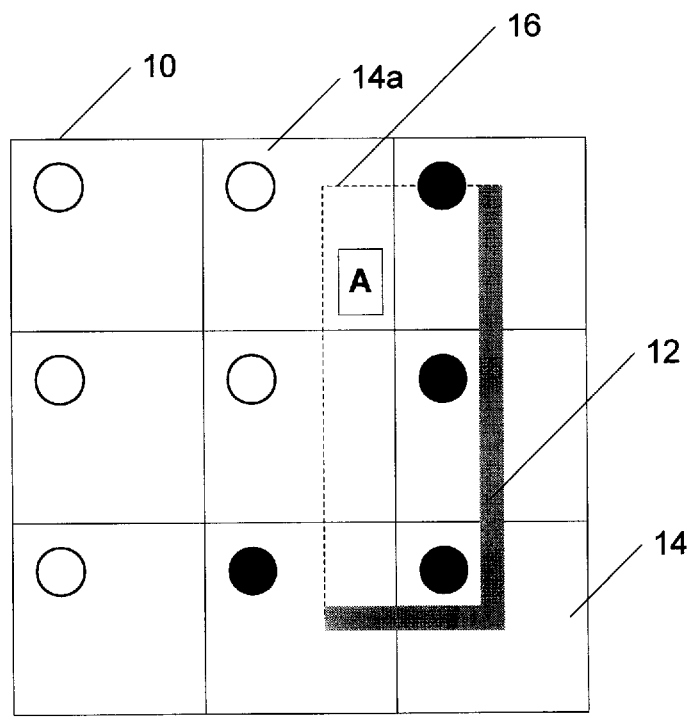
FIG. 3A is a first diagram of a method for tracking invalidation information in tiled image representations in accordance with the present invention.

In accordance with the present invention, to invalidate an area, the implementing program generates an invalidation rectangle so that it bounds the area and any previous non-empty invalidation rectangle, and also sets the invalid tile flags in the tiles overlapping that area. An example is shown in FIG. 3A, where the "L" shaped area 12 within the image 10 represents invalid pixels. Each tile 14 having pixels in common with the "L" shaped area 12 is flagged as invalid. In addition, an invalidation rectangle 16 is defined to contain all of the pixels needing recalculation. The invalidation rectangle 16 thus defines a boundary on invalid pixels within the tiled pixel image 10, but also generally contains valid pixels.

Figure 4:
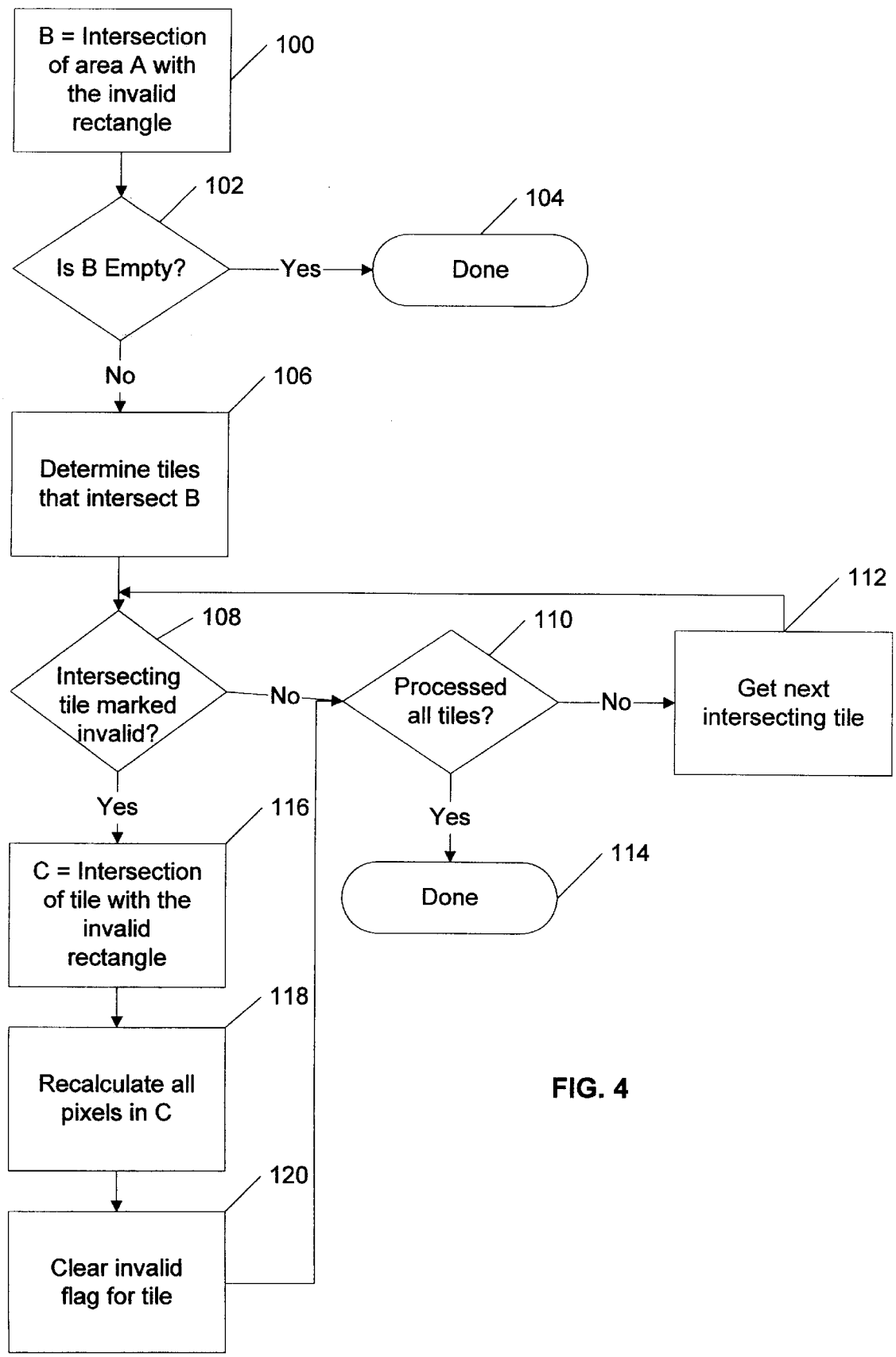
FIG. 4 is a flowchart of the preferred embodiment of the inventive method.

To validate an area A within the image 10, the inventive method performs the following steps, shown in the flowchart in FIG. 4:

Define area B as the intersection of the area A to be validated with the invalidation rectangle 16 (Step 100). If area B is empty (Step 102), the process is done: no pixels in area A are invalid (Step 104). If area B is not empty (Step 102), then determine which tiles 14 intersect area B (Step 106).

For each tile 14 intersecting area B, if the tile is marked as valid (Step 108), and more tiles need to be processed (Step 110), get the next tile that intersects area B (Step 112). If all tiles have been processed (Step 110), the process is done (Step 114).

If a tile is marked invalid (Step 108), then define area C as the intersection of the area covered by the tile 14 with the invalidation rectangle 16 (Step 116). Then validate area C by recalculating all of the pixels in area C (Step 118), and clear the invalid flag for that tile (Step 120). If more tiles need to be processed (Step 110), the next tile 14 is fetched (Step 112). Otherwise, the process is done: no pixels in any area C (and hence in area A) are invalid (Step 114).

For example, in FIG. 3A, if area A is to be validated, the defined area B will be the same as area A. Since B is not empty, the tiles 14 that intersect B are determined; in this case, only tile 14a intersects B. However, tile 14a is not marked invalid, and hence the process is done—no pixels need be recalculated at all.

Figure 3B:
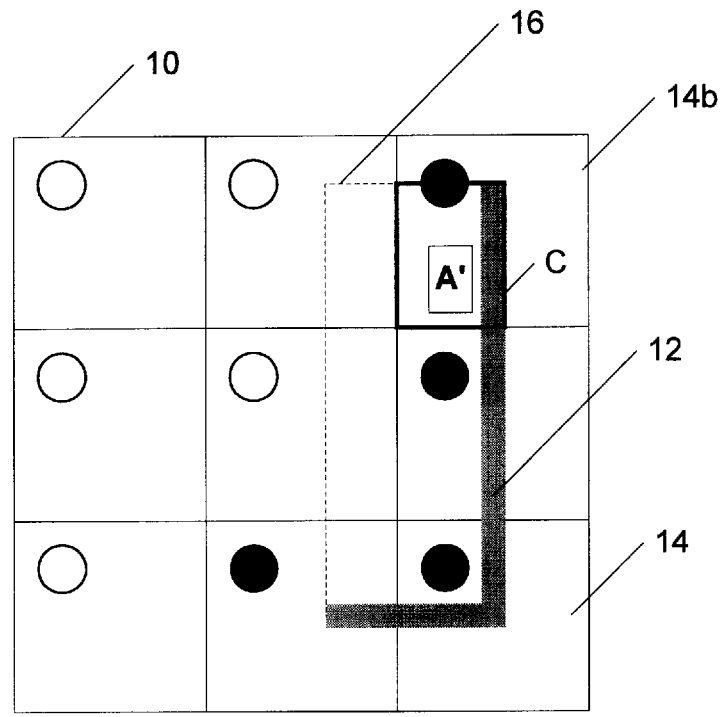
FIG. 3B is a second diagram of a method for tracking invalidation information in tiled image representations in accordance with the present invention.

As another example, in FIG. 3B, if area A' is to be validated, the defined area B will be the same as area A'. Since B is not empty, the tiles 14 that intersect B are determined; in this case, only tile 14b intersects B. Tile 14b is marked invalid, and hence the area C is determined as the intersection of the area covered by the tile 14b with the invalidation rectangle 16; in FIG. 3B, area C region is shown in bold outline. Accordingly, all pixels in C are recalculated, and the invalid tile flag for tile 14b is cleared.

After validating an area, the invalidation rectangle should be shrunken so that when it is grown in the future, it does not unnecessarily include valid pixels. The shrink process involves the following step: for each tile 14 intersecting the area defined by the current invalidation rectangle 16, if the tile is flagged as invalid, accumulate the intersection of the area covered by that tile 14 with the invalidation rectangle 16 into the new invalidation rectangle.

Figure 3C:
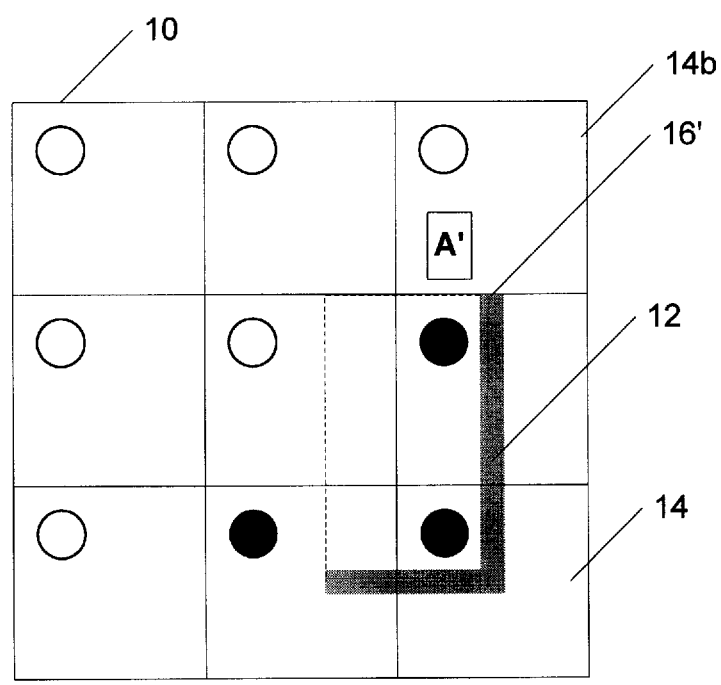
FIG. 3C is a third diagram of a method for tracking invalidation information in tiled image representations in accordance with the present invention.

Performing this process on FIG. 3B results in the configuration shown in FIG. 3C. Since tile 14b is no longer flagged as invalid, it is omitted from the new invalidation rectangle 16'.

Since shrinking the old invalidation rectangle 16 is of concern only just before it has to be grown, shrinking can be performed "lazily" by keeping a flag indicating whether there is a need to shrink, and checking the flag before growing the invalidation rectangle 16 again.

Like the invalid tile flags only approach, under the present invention, disk traffic can be optimized by not transferring image tiles which are entirely invalid. Unlike the invalid tile flags only approach, however, this needs to be done by checking tiles 14 to see whether they are both marked as invalid and fully contained within the invalidation rectangle 16.

This inventive approach is not as accurate as the region approach in tracking only invalid pixels, and thus the inventive system may calculate more pixels than were requested in the validation operation since all of the invalid pixels in a tile must be validated before the tile can be marked as valid. The present system may also consider pixels invalid which were never included in any of the areas passed to the invalidation operations—for example, the pixels above and to the left of the gray area within the flagged tiles in the FIG. 3A. However, the present invention does limit the scope of the recalculation more than either of the invalid tile flag or invalidation rectangle approaches alone without incurring the overhead and complexity of the region-based approach. The present invention thus provides improved performance over the prior art.

The present invention also provides a procedure for determining the minimal set of pixels that must be recalculated/validated so that (1) all of the pixels within a specified image area are reported as valid by the procedure and (2) all pixels that were considered invalid before recalculation and that do not get recalculated will still be considered invalid by the procedure.

Interaction with Tile Sharing and Image Pyramids

The inventive approach to tracking invalid areas works quite nicely in conjunction with image tile sharing of the type described in U.S. patent application Ser. No. 08/702, 941. If the invalid tile flag is kept in the data structure used to manage particular image tiles, then all of the images sharing a particular image tile will benefit when manipulation of any one of the images marks the image tile as valid.

Image pyramids can be viewed as a collection of images. The implementing program in the preferred embodiment maintains separate invalidation information for each level of the pyramid in accordance with the above description.

Implementation

The invention may be implemented in hardware or software, or a combination of both. However, preferably, the invention is implemented in computer programs executing on programmable computers each comprising a processor, a data storage system (including volatile and non-volatile memory and/or storage elements), at least one input device, and at least one output device. Program code is applied to input data to perform the functions described herein and generate output information. The output information is applied to one or more output devices, in known fashion.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage media or device (e.g., ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

What is claimed is:

1. A computer-implemented method for tracking invalidation information in a stored tiled pixel image representation in a computer comprising the step of:

(a) determining a pixel within a tile of the stored tiled pixel image representation is possibly invalid if and only if the pixel lies within an invalidation rectangle and the tile containing that pixel is flagged as invalid.

2. A computer-implemented method for tracking invalidation information in a stored tiled pixel image representation in a computer comprising the steps of:

(a) determining that a pixel within a tile of the stored tiled pixel image representation lies within an invalidation rectangle;

(b) determining that the tile containing the pixel is flagged as invalid;

(c) determining the pixel is possibly invalid in response to such determinations.

3. A computer-implemented method for marking an area in a stored tiled pixel image representation as invalid in a computer, comprising the steps of:

(a) generating an invalidation rectangle that bounds the area and any previous non-empty invalidation rectangle;

(b) setting an invalid tile flag in each tile intersecting the area.

4. A computer-implemented method for validating an area A in a stored tiled pixel image representation, the stored tiled pixel image representation having an invalidation rectangle defining a boundary on invalid pixels within the stored tiled pixel image representation and having each tile containing an invalid pixel being marked with an invalid tile flag, comprising the steps of:

(a) defining area B as the intersection of area A with the invalidation rectangle;

(b) if area B is empty, indicating that area A is valid;

(c) if area B is not empty, then determining which tiles marked with an invalid tile flag intersect area B;

(d) for each such tile intersecting area B:
  (i) defining an area C as the intersection of the area covered by such tile with the invalidation rectangle;
  (ii) validating all pixels in each such area C;
  (iii) clearing the invalid flag for such tile.

5. The method of claim 4, further comprising the steps of:
(a) shrinking the invalidation rectangle by the steps of:
  (1) determining each tile intersecting the invalidation rectangle that is flagged as invalid;
  (2) accumulating the intersection of the area covered by each such tile with the invalidation rectangle into a new invalidation rectangle.

6. A computer system for tracking invalidation information in a stored tiled pixel image representation comprising:
(a) means for determining if a pixel within a tile of the stored tiled pixel image representation lies within an invalidation rectangle and the tile containing that pixel is flagged as invalid;
(b) means for determining each such pixel is possibly invalid in response to such determination.

7. A computer system for tracking invalidation information in a stored tiled pixel image representation comprising:
(a) means for determining that a pixel within a tile of the stored tiled pixel image representation lies within an invalidation rectangle;
(b) means for determining that the tile containing the pixel is flagged as invalid;
(c) means for determining each such pixel is possibly invalid in response to such determinations.

8. A computer system for marking an area in a stored tiled pixel image representation as invalid, comprising:
(a) means for generating an invalidation rectangle that bounds the area and any previous non-empty invalidation rectangle;
(b) means for setting an invalid tile flag in each tile intersecting the area.

9. A system for validating an area A in a stored tiled pixel image representation, the stored tiled pixel image representation having an invalidation rectangle defining a boundary on invalid pixels within the stored tiled pixel image representation and having each tile containing an invalid pixel being marked with an invalid tile flag, comprising:
(a) means for defining area B as the intersection of area A with the invalidation rectangle;
(b) means for indicating that area A is valid if area B is empty;
(c) means for determining which tiles marked with an invalid tile flag intersect area B if area B is not empty;
(d) means for defining at least one area C as the intersection of the area covered by each such tile intersecting area B with the invalidation rectangle;
(e) means for validating all pixels in each such area C;
(f) means for clearing the invalid flag for each such tile.

10. The system of claim 9, further comprising:
(a) means for shrinking the invalidation rectangle by determining each tile intersecting the invalidation rectangle that is flagged as invalid, and accumulating the intersection of the area covered by each such tile with the invalidation rectangle into a new invalidation rectangle.

11. A computer program, residing on a computer-readable medium, for tracking invalidation information in a stored tiled pixel image representation, the computer program comprising instructions for causing a computer to:
(a) determine a pixel within a tile of the stored tiled pixel image representation is possibly invalid if and only if the pixel lies within an invalidation rectangle and the tile containing that pixel is flagged as invalid.

12. A computer program, residing on a computer-readable medium, for tracking invalidation information in a stored tiled pixel image representation, the computer program comprising instructions for causing a computer to:
(a) determine that a pixel within a tile of the stored tiled pixel image representation lies within an invalidation rectangle;
(b) determine that the tile containing the pixel is flagged as invalid;
(c) determine the pixel is possibly invalid in response to such determinations.

13. A computer program, residing on a computer-readable medium, for marking an area in a stored tiled pixel image representation as invalid, the computer program comprising instructions for causing a computer to:
(a) generate an invalidation rectangle that bounds the area and any previous non-empty invalidation rectangle;
(b) set an invalid tile flag in each tile intersecting the area.

14. A computer program, residing on a computer-readable medium, for validating an area A in a stored tiled pixel image representation, the stored tiled pixel image representation having an invalidation rectangle defining a boundary on invalid pixels within the stored tiled pixel image representation and having each tile containing an invalid pixel being marked with an invalid tile flag, the computer program comprising instructions for causing a computer to:
(a) define area B as the intersection of area A with the invalidation rectangle;
(b) if area B is empty, indicate that area A is valid;
(c) if area B is not empty, then determine which tiles marked with an invalid tile flag intersect area B;
(d) for each such tile intersecting area B:
  (i) define an area C as the intersection of the area covered by such tile with the invalidation rectangle;
  (ii) validate all pixels in such area C;
  (iii) clear the invalid flag for such tile.

15. The computer program of claim 14, further comprising instructions for causing a computer to:
(a) determine each tile intersecting the invalidation rectangle that is flagged as invalid;
(b) accumulate the intersection of the area covered by each such tile with the invalidation rectangle into a new invalidation rectangle.

* * * * *